Oct. 11, 1955     A. F. COSENTINO     2,720,324
DEMOUNTABLE VEHICLE BODIES
Filed Oct. 1, 1954     5 Sheets-Sheet 1
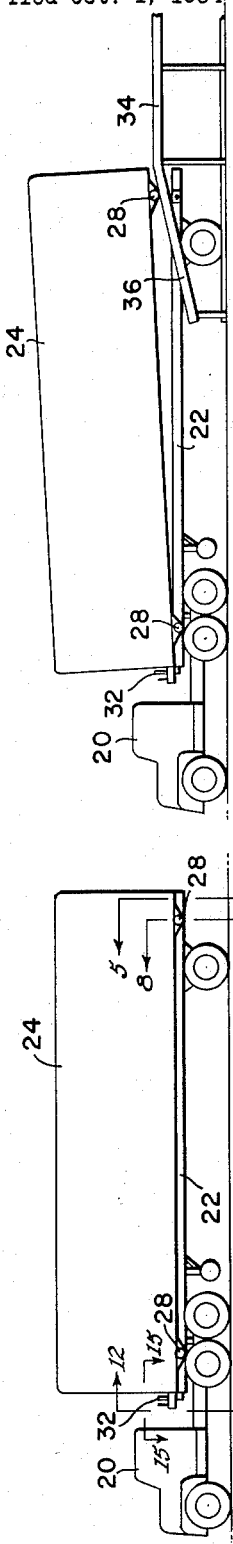
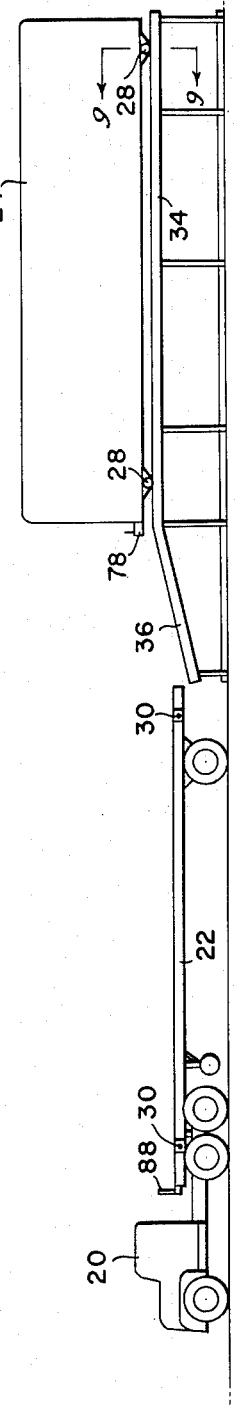
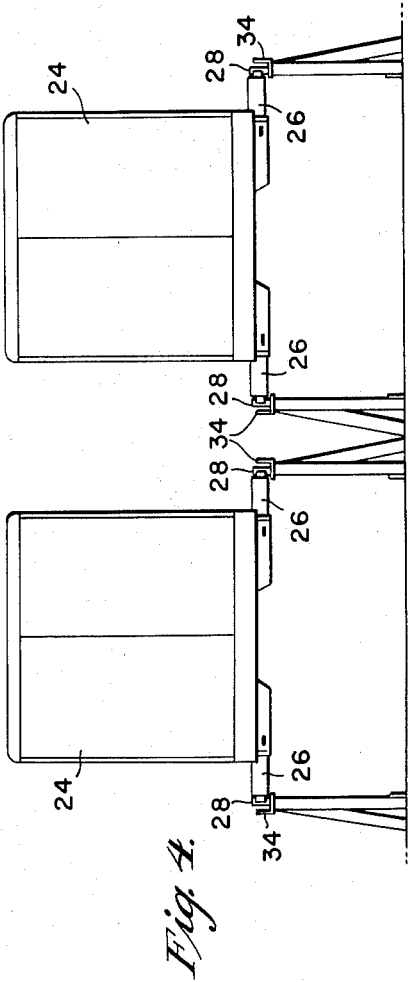
INVENTOR.
ANTHONY F. COSENTINO
BY
Caesar and Rivise
ATTORNEYS.

Oct. 11, 1955 A. F. COSENTINO 2,720,324
DEMOUNTABLE VEHICLE BODIES
Filed Oct. 1, 1954 5 Sheets-Sheet 2

INVENTOR.
ANTHONY F. COSENTINO
BY
Caesar and Rivise
ATTORNEYS.

Oct. 11, 1955 A. F. COSENTINO 2,720,324
DEMOUNTABLE VEHICLE BODIES
Filed Oct. 1, 1954 5 Sheets-Sheet 3
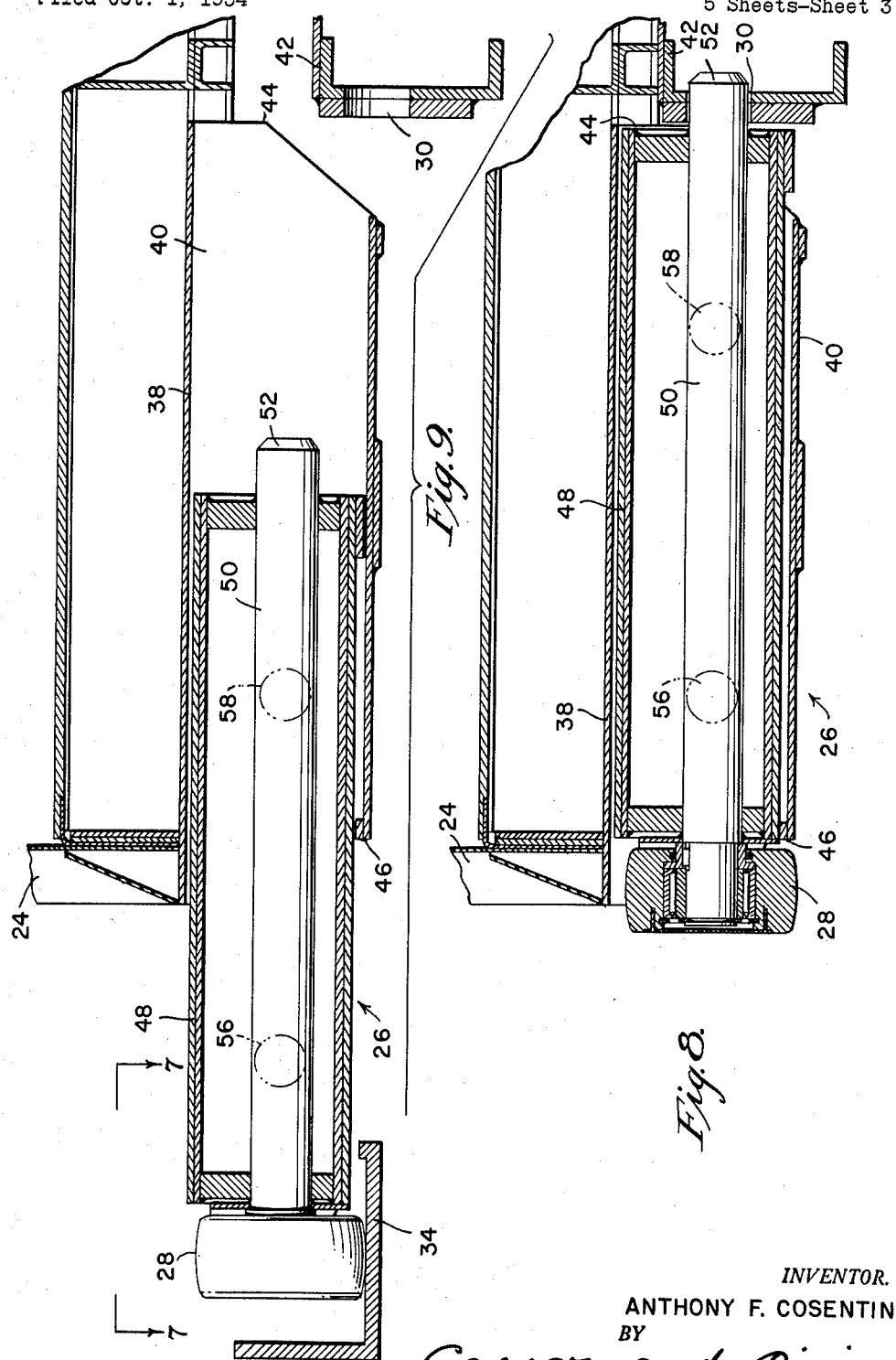
INVENTOR.
ANTHONY F. COSENTINO
BY
Caesar and Rivise
ATTORNEYS Oct. 11, 1955     A. F. COSENTINO     2,720,324
DEMOUNTABLE VEHICLE BODIES Filed Oct. 1, 1954     5 Sheets-Sheet 4

INVENTOR.
ANTHONY F. COSENTINO
BY
Caesar and Rivise
ATTORNEYS.

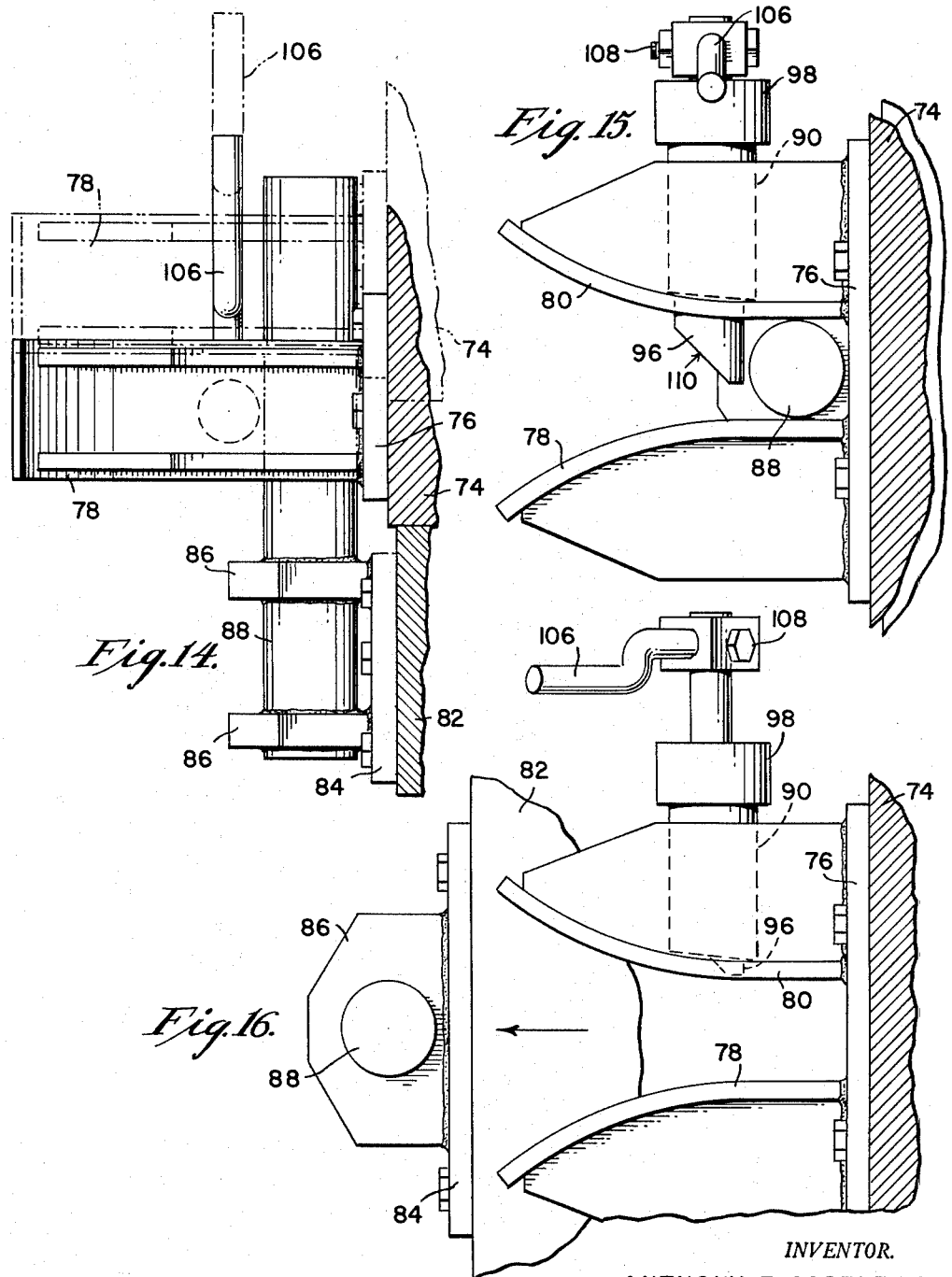

United States Patent Office 2,720,324
Patented Oct. 11, 1955

2,720,324

DEMOUNTABLE VEHICLE BODIES

Anthony F. Cosentino, Chicago, Ill.

Application October 1, 1954, Serial No. 459,611

12 Claims. (Cl. 214—38)

This invention relates to a vehicle comprising a prime mover and a demountable body, in combination with a pair of spaced elevated tracks whereby the vehicle may be driven between the tracks and the body may be supported upon the tracks separate from the prime mover.

The primary object of the invention is to provide a vehicle construction with a demountable body whereby the body can be supported upon elevated tracks and the prime mover can be free to support and transfer another body with freight therein. Thus, a single prime mover can be efficiently employed to transport many vehicle bodies with freight therein. At the same time, the demounted vehicle bodies containing freight can be supported upon tracks for the loading and unloading operation, while the prime mover is engaged in the transportation of other freight.

Another object of the invention is to provide a vehicle comprising a prime mover, a trailer connected thereto, and a body demountably supported on the trailer in combination with spaced elevated tracks whereby the vehicle can be backed into the space between the tracks in such a manner that the tracks will engage and support the body and the prime mover and trailer can be driven out with a minimum of effort and manipulation for subsequent re-use in the hauling of freight.

Another object of the invention is to provide a vehicle of the character described including a hand operated means for attaching and detaching the body from the trailer, said means also including bearing members which are movable to a predetermined position outwardly of the sides of the body. In this latter position, the bearings automatically engage a pair of spaced elevated tracks on both sides of the body when the vehicle is backed between the tracks.

A further object of the invention is to provide a vehicle of the character described which includes a means releasably coupling the front end of the body to the front end of the trailer behind the prime mover. Thus, after the means removably connecting the body to the trailer have been moved to a position where the body is disengaged from the trailer and the bearing members are in a position to ride upon the spaced elevated tracks, the coupling serves as a drive connection between the body and the prime mover so that the body can be positively driven onto the tracks when the vehicle is being backed between the tracks. After the entire body is supported upon the elevated tracks, the drive coupling can be manually released and the prime mover and trailer are free to be driven away while the body remains supported upon the tracks.

And yet another object of the invention is to provide a vehicle of the character described wherein the means for demountably securing the body to the trailer and the means for releasably coupling the front end of the body to the front end of the trailer are strong and secure even though they are easily operated by hand.

These and other objects of the invention will become more apparent as the following description proceeds in conjunction with the drawings, wherein:

Figure 1 is a diagrammatic view of a vehicle made in accordance with the principles of the present invention;

Figure 2 is a view similar to Figure 1 and illustrating the first stage in the elevation of the demountable body upon tracks;

Figure 3 is a view similar to Figure 2 and illustrating the final stage in the demounting of the body from the vehicle and illustrating the vehicle in position to be driven away from the tracks;

Figure 4 is a rear elevational diagrammatic view illustrating the manner in which several demountable bodies are supported adjacent each other upon tracks;

Figure 8 is an enlarged sectional view taken on the line 8—8 of Figure 1;

Figure 9 is an enlarged sectional view taken on the line 9—9 of Figure 3, a portion of the trailer frame being shown in cross section;

Figure 14 is a sectional view taken on the line 14—14 of Figure 12;

Figure 15 is an enlarged elevational view taken from the line 15—15 of Figure 1; and Figure 16 is a view similar to Figure 15 and illustrating the manner in which the trailer is uncoupled from the front end of the body.

Specific reference will now be made to the drawings wherein similar reference characters are used for corresponding elements throughout.

Figure 5:
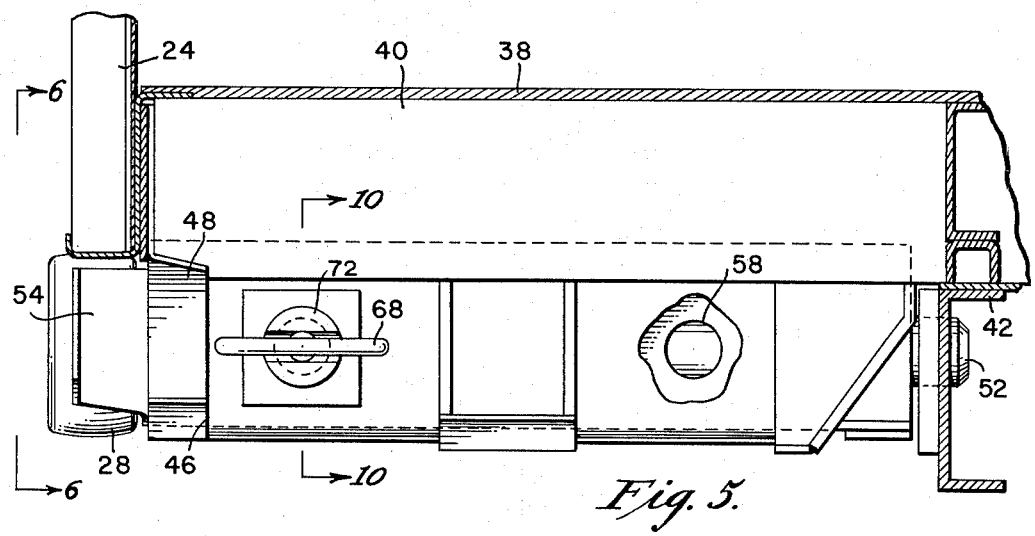
Figure 5 is an enlarged sectional view taken on the line 5—5 of Figure 1.
Figure 6:
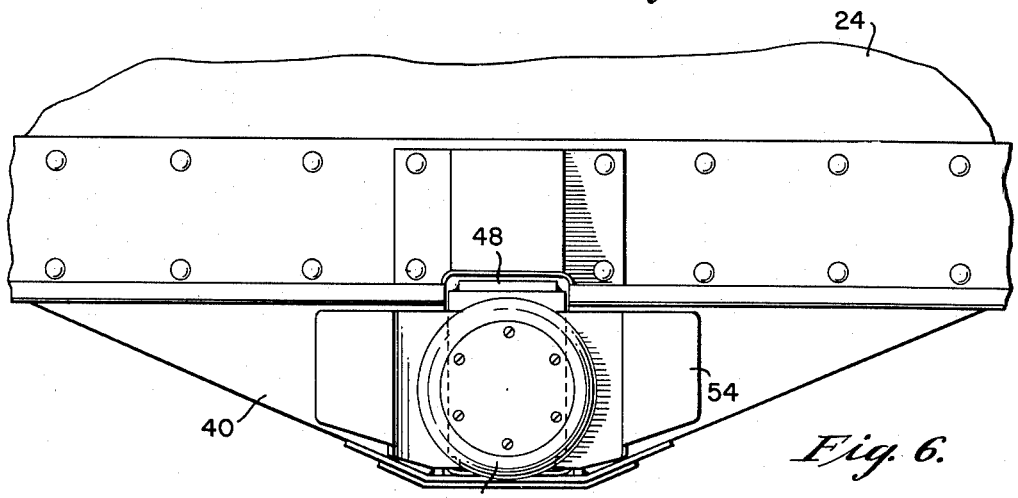
Figure 6 is an end elevational view taken from the line 6—6 of Figure 5.
Figure 7:
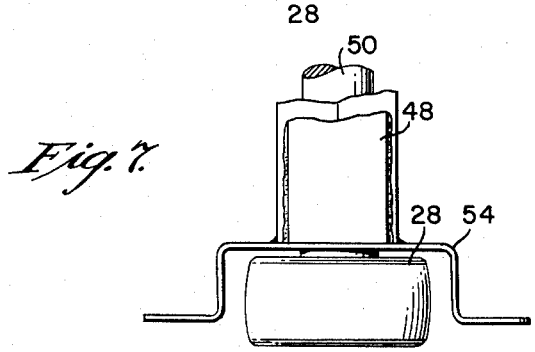
Figure 7 is an elevational view taken from the line 7—7 of Figure 9.

The basic principles of the invention are illustrated in Figures 1-4 in connection with a conventional van-type trailer, it being understood that the principles of the invention can be applied to any vehicle having a prime mover and a demountable body. As illustrated in these figures, the vehicle comprises a prime mover 20 to which is secured in a conventional manner a wheeled trailer 22 upon which is mounted a body 24. The body 24 is removably secured to the trailer by a means 26 which will be described in detail hereinafter, said means including bearing members or rollers 28 at their outer ends. The means 26 is carried at the bottom of the body adjacent its corners and is movable into and out of engagement with suitable apertures 30 in the sides of the trailer. When the means 26 is moved to a predetermined position out of engagement with the trailer, the bearing members or rollers 28 will extend a predetermined distance outwardly of the sides of the body, as shown clearly in Figure 4. The front end of the body behind the prime mover 20 is releasably coupled to the front end of the trailer by a means 32 to be described in detail hereinafter. A pair of tracks 34 are provided which are spaced apart on both sides of the body a distance sufficient to engage the rollers 28 when they are moved into the predetermined position outwardly of the body and the means 26 carrying said rollers has been disengaged from the trailer. The said tracks 34 include a horizontal portion which is elevated above height of the trailer and an inclined forward ramp portion 36 which extends at its lower end beneath the sides of the trailer.

In use, the vehicle is backed up to the tracks and the means 26 are manually operated so that they are disengaged from the apertures 30 in the trailer and the rollers 28 at their ends are in position for engagement of the ramp portions 36 of the tracks. Because the body 24 still remains coupled to the trailer 22 and the prime mover 20 but only at its forward end, continued backing of the vehicle will drive the body 24 onto the tracks as illustrated in Figure 2. After the entire body has been supported upon the tracks, as shown in Figure 3, the forward coupling member 32 is released and the vehicle 20 and trailer 22 are driven out for service elsewhere, the body 24 remaining on the tracks for subsequent unloading and loading operations.

As illustrated in Figure 4, a plurality of pairs of tracks 34 can be provided side by side in any desired storage space for supporting a plurality of the bodies which have been demounted from the vehicle in the manner previously described.

Coming now to Figures 5–11 which illustrate the demounting means 26 and the rollers 28 in detail, it will be seen that the body 24 may be substantially rectangular and of conventional construction including sides, front and rear ends and a base member 38. Secured by any suitable means to the base member 38 of the body adjacent its corners and extending transversely thereof is a bracket member 40, preferably in the form of a casing. The base of the body rests upon the upper surface of the structural members making up the trailer and includes longitudinal portions which overhang or extend beyond the side frame members 42 of the trailer. The bracket member or casing 40 depends from the base member 38 of the body in this overhang portion so that the inner end 44 of the bracket member is adjacent the outer surface of each of the longitudinal trailer frame members 42 and the outer end 46 of the bracket member lies adjacent the outer surfaces of the side members of the body.

The means 26 preferably comprises a casing 48 which is slidably mounted in the bracket member 40 and is substantially coextensive therewith. Secured centrally through and movable with the casing 48 is a shaft 50. The bearing member or roller 28 may be of any desirable type and is rotatably mounted upon the outer end of the shaft 50 exteriorly of the casing 48. The inner end 52 of the shaft 50 is tapered, extends beyond the casing 48 and is adapted to engage in the aperture 30 in the trailer side member 42. The outer end of the casing 48 is further provided with a plate 54 which is bent around and spaced from the roller 28 and serves as a handle.

Figure 11:
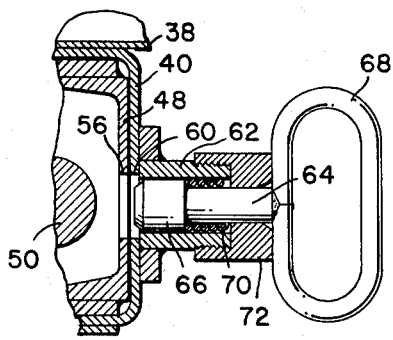
Figure 11 is a fragmentary sectional view like that of Figure 10 and illustrating the retracted position of the spring loaded pin of Figure 10.

A means is provided to selectively retain the casing 48 and the associated shaft 50 in and out of engagement with the trailer frame. This means comprises a pair of transversely spaced apertures 56 and 58 which are provided at predetermined locations in the casing 48. Another aperture 60 is provided at a predetermined location in the bracket member 40. Secured to the side of the bracket member in communication with the aperture 60 is a housing 62 in which is slidably positioned a pin 64 having an enlarged head 66 at its inner end and a loop handle 68 at its other end. A spring 70 is wound about the reduced portion of the pin 64 and is interposed between the enlarged portion 66 of the pin and a nut 72 which is secured at the end of the housing 62. The spring 70 normally urges the head 66 of the pin through the aperture 60 of the bracket member 40 and into one of the apertures 56 or 58 which is provided in the casing 48. The spring-loaded pin 64 can be retracted out of engagement with either of the apertures 56 and 58 by exerting a pull outwardly on the handle 68 and turning the handle 90° to engage shoulders on the grooved nut 72, as shown in Figure 11, in which case the pin 64 is securely but releasably retained in a disengaged position.

Figure 10:
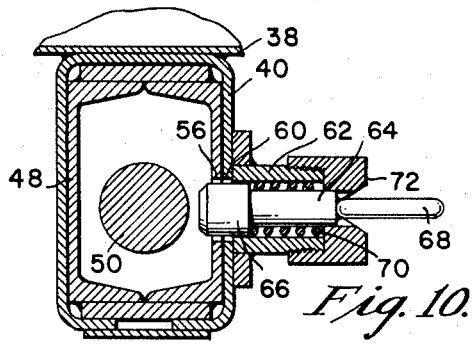
Figure 10 is a sectional view taken on the line 10—10 of Figure 5.

When the spring-loaded pin 64 is made to engage in the outer aperture 56 in the casing 48, as shown in Figures 5, 8 and 10, the inner end 52 of the shaft will extend in the aperture 30 provided in the side member 42 of the trailer. In this position, the body 24 is in engagement with the trailer 22 and the roller 28 is positioned beneath the bottom of the body in substantial alignment with the sides thereof. To disengage the body from the trailer, the spring-loaded pin 64 is pulled outwardly by its handle 68 and retained in the position shown in Figure 11. An outward pull is exerted on the handle 54 and then the spring-loaded pin 64 is released by turning its handle 68 into the position shown in Figure 10. The pull on the handle 54 is continued until the spring-loaded pin 64 engages in the inner aperture 58 of the casing 48, as shown in Figure 9. When this occurs, the inner end 52 of the shaft 50 moves out of the aperture provided in the side member 42 of the trailer and the roller 28 assumes a predetermined fixed position outwardly of the side of the body. Inasmuch as the tracks 34 are spaced on both sides of the body a distance sufficient to engage the rollers 28 when they are in the outward position, as shown in Figure 9, when the vehicle is backed between the tracks, the rollers will automatically engage the tracks.

In the position of the rollers shown in Figure 9, the body 24 is disengaged from the trailer and merely rests thereon. Thus, in this position, if the rollers are made to engage the tracks 34, the body cannot be backed onto the tracks unless there is an additional drive connection between the body and the trailer in advance of the forward rollers, as mentioned hereabove. Accordingly, the forward end of the body is releasably secured to the forward end of the trailer behind the prime mover 20 by the means 32. This means is shown in detail in Figures 12–16 and will be described in detail hereinafter.

The front end 74 of the body 24 has welded or otherwise secured thereto a plate 76 to which is appropriately secured a pair of longitudinally extending, outwardly curved spaced keeper plates 78 and 80. Appropriately secured to the front end 82 of the trailer in substantial vertical alignment with the plate 76 is another plate 84 containing spaced bearings 86 in which is welded an upstanding rod 88. The rod is adapted to extend into the space between the keeper plates 78 and 80 on the front end of the body and is of such length as to remain in said space after the body has been raised fully on the tracks. A means is provided to releasably hold the rod 88 in the space between the keeper plates 78 and 80 so that the drive connection between the body and the trailer is positively maintained until the body is entirely supported upon the tracks. This means comprises a transversely extending housing 90 welded on the plate 76 and communicative with an aperture 92 in the keeper plate 80. Slidably mounted in the housing 90 is a latch pin or plunger 94 having an enlarged portion 96 which extends through the aperture 92. The housing is capped at its outer end as at 98 and a spring 100 is wound about the reduced portion of the latch pin 94 and is interposed between the cap 98 and the enlarged portion 96. The spring normally urges the enlarged portion 96 of the latch pin through the aperture 92 of the keeper plate 80 to close off a portion of the space between the keeper plates 78 and 80 in advance of the coupling rod 88, as shown clearly in Figures 12, 13 and 15. A bayonet slot 102 is provided in a portion of the housing 90 and a pin 104 is carried by the enlarged portion 96 of the latch pin and extends through the bayonet slot 102. A suitable handle 106 is secured as at 108 to the outer end of the latch pin 94 which extends through the cap 98.

Thus, when the vehicle is backed between the tracks, and the rollers have been moved to the outward position as shown in Figure 9, the rollers automatically engage the ramp portion 36 of the tracks, as shown in Figure 2. The enlarged portion 96 of the latch pin 94 is maintained in the position shown in Figures 12, 13 and 15, so that there is a positive connection between the front end of the body and the front end of the trailer during the time that the vehicle is backed between the tracks. When the body is entirely supported upon the elevated tracks 34, the handle 106 is moved outwardly and then turned in the position shown in Figure 16, so that the enlarged portion 96 of the latch pin is retracted away from the coupling rod 88. In this position the prime mover 20 and connected trailer 22 can be driven away from the demounted body for re-use elsewhere while the body remains elevated upon the tracks.

Figure 12:
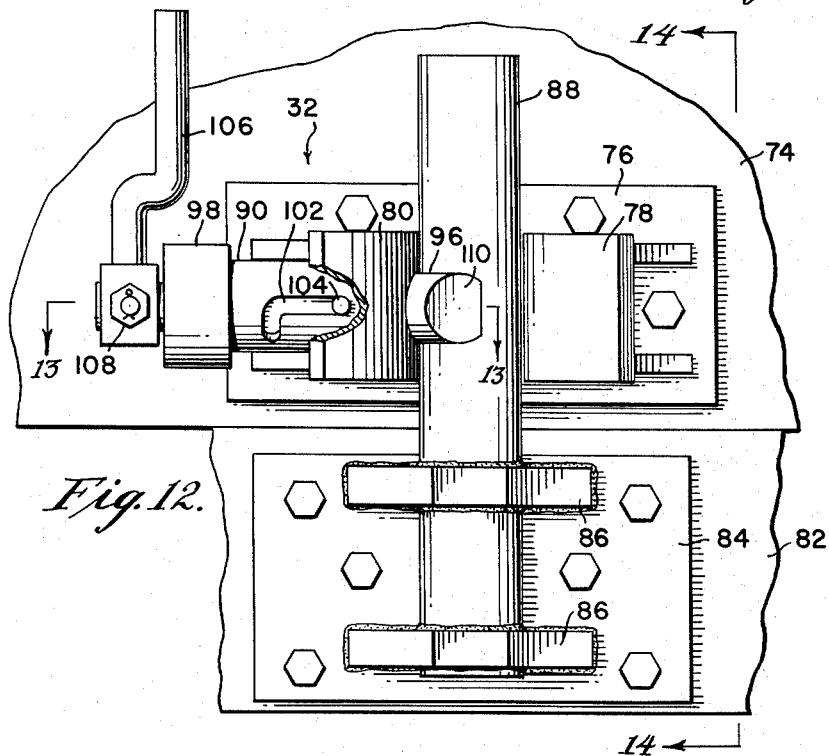
Figure 12 is an enlarged elevational view taken from the line 12—12 of Figure 1.
Figure 13:
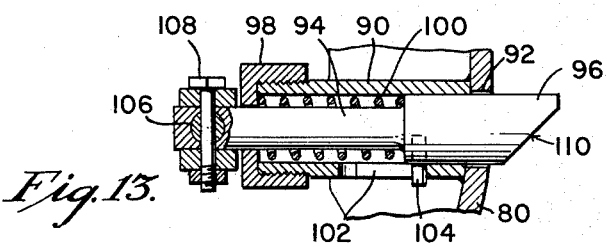
Figure 13 is a sectional view taken on the line 13—13 of Figure 12.

The handle 106 can then be turned back to the position shown in Figures 12, 13 and 15 on the body which is supported upon the elevated tracks. Because the enlarged portion 96 of the latch pin includes an inclined cam surface 110, the trailer can be backed between the tracks until the coupling rod 88 strikes the cam 110 of the latch pin, whereupon the latch pin is caused to move against the action of the spring 100 and then release so that the coupling rod 88 is positively held into the keeper plates 78 and 80. This permits ready removal of the body 24 from the elevated tracks after the contents thereof have been unloaded or reloaded.

While a preferred embodiment of the invention has been shown and described hereabove, it will be understood that minor variations may be made in the construction and arrangement of parts by skilled artisans without departing from the spirit of the invention and the scope of the appended claims.

I claim:

1. In combination with a vehicle having a prime mover, a trailer connected thereto and a body mounted on the trailer, a pair of elevated tracks spaced apart a distance greater than the width of the body, and means carried by the body and removably connecting the same to the trailer, said means being positionable when disengaged from the trailer to bear on the tracks and retain the body separate from the trailer.

2. In combination with a vehicle having a prime mover, a trailer connected thereto and a body mounted on the trailer, a pair of elevated tracks spaced apart a distance greater than the width of the body, so that the trailer and body may be driven between the tracks, means carried by the body and removably connecting the same to the trailer, and means to releasably retain said first-named means disengaged from the trailer, said first-named means being positionable when disengaged from the trailer to bear on the tracks and retain the body separate from the trailer.

3. In combination with a vehicle having a prime mover, a trailer connected thereto and a substantially rectangular body mounted on the trailer, a pair of elevated tracks spaced apart a distance greater than the width of the body so that the body and trailer may be driven between the tracks, means carried by the body adjacent its corners and removably connecting the same to the trailer, means to releasably retain said first-named means disengaged from the trailer and in position to bear on the tracks, and means coupling the front of the body to the front of the trailer, said coupling means being releasable after the entire body has been supported on the tracks to permit complete separation and retraction of the prime mover and trailer from the body.

4. A vehicle having a prime mover, a trailer connected thereto and a body mounted on the trailer, means carried by the body and removably connecting the same to the trailer, bearing members carried by said means, and means to releasably retain said first-named means disengaged from the trailer whereby the bearing members are adapted to engage a pair of spaced tracks on both sides of the body.

5. A vehicle having a prime mover, a trailer connected thereto, and a substantially rectangular body mounted on the trailer, means carried by the body adjacent its corners and removably connecting the same to the trailer, bearing members carried by said means, means to releasably retain said first-named means disengaged from the trailer whereby the bearing members are adapted to engage a pair of spaced tracks on both sides of the body, and coupling means connecting the front of the body to the front of the trailer, said coupling means being releasable after the entire body has been supported by the bearing members upon a pair of tracks.

6. A vehicle having a prime mover, a trailer connected thereto and a substantially rectangular body mounted on the trailer, a transversely extending bracket depending from the body adjacent each corner thereof, a transversely extending member slidably mounted on said bracket, a roller mounted on the outer end of said member, means to retain said member in a selected position of engagement in and disengagement from an aperture provided in the trailer, and a pair of elevated tracks on both sides of the body spaced apart a predetermined distance sufficient to engage said rollers when the members carrying said rollers are in said selected disengaged position, whereby the body is supported separately from the trailer.

7. The combination of claim 6 wherein said means includes a pair of spaced apertures provided in said member and a spring-loaded retractible pin carried by said bracket and adapted to selectively engage in said apertures.

8. The combination of claim 7 wherein said rollers are adapted to extend beyond the sides of said body when the members carrying said rollers are in the selected position of disengagement from the trailer.

9. The combination of claim 8 wherein said members carrying said rollers include handle portions for moving said members into and out of the said selected positions of engagement with and disengagement from the trailer.

10. In combination with a vehicle having a prime mover, a trailer connected thereto and a substantially rectangular body mounted on the trailer, means carried by the body adjacent its lower corners and removably connecting the same to the trailer, bearing members carried by said means, means to releasably retain said first-named means in selected positions of engagement with and disengagement from the trailer whereby said bearing members are disposed in substantial alignment with the sides of the body in the position of engagement and disposed at a predetermined position outwardly of the sides of the body in the position of disengagement, and a pair of tracks on both sides of the body spaced apart a predetermined distance to engage said bearing members when they are spaced outwardly from the body.

11. The combination of claim 10 and releasable coupling means drivingly connecting the front end of the body to the front end of the trailer.

12. The combination of claim 11 wherein said coupling means includes a vertically extending rod secured at its lower end to the front end of the trailer, a keeper open at its forward end and secured to the front end of the body, said keeper receiving said rod, and a latch releasably holding said rod in said keeper, said latch being selectively positionable across and retractible from the forward open end of said keeper in front of said rod.

References Cited in the file of this patent

UNITED STATES PATENTS

| 801,362 | Coghill, Jr. | Oct. 10, 1905 |

FOREIGN PATENTS

| 862,123 | Germany | Jan. 8, 1953 |